United States Patent
Shur

(10) Patent No.: US 12,282,694 B2
(45) Date of Patent: Apr. 22, 2025

(54) SMART VISUAL DISPLAY

(71) Applicant: Rensselaer Polytechnic Institute, Troy, NY (US)

(72) Inventor: Michael Shur, Vienna, VA (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/769,475

(22) PCT Filed: Oct. 21, 2020

(86) PCT No.: PCT/US2020/056550
§ 371 (c)(1),
(2) Date: Apr. 15, 2022

(87) PCT Pub. No.: WO2021/081017
PCT Pub. Date: Apr. 29, 2021

(65) Prior Publication Data
US 2024/0134587 A1 Apr. 25, 2024
US 2024/0231729 A9 Jul. 11, 2024

Related U.S. Application Data

(60) Provisional application No. 62/923,785, filed on Oct. 21, 2019, provisional application No. 63/093,858, filed on Oct. 20, 2020.

(51) Int. Cl.
G09G 5/00 (2006.01)
G06F 3/14 (2006.01)
G09G 3/32 (2016.01)

(52) U.S. Cl.
CPC .......... *G06F 3/14* (2013.01); *G09G 3/32* (2013.01); *G09G 2320/0666* (2013.01); *G09G 2320/0686* (2013.01); *G09G 2320/0693* (2013.01); *G09G 2354/00* (2013.01); *G09G 2360/144* (2013.01); *G09G 2370/04* (2013.01)

(58) Field of Classification Search
CPC .... G06F 3/14; G09G 3/32; G09G 2320/0666; G09G 2320/0686; G09G 2320/0693; G09G 2354/00; G09G 2360/144; G09G 2370/04
USPC .......................................................... 345/207
See application file for complete search history.

(56) References Cited

U.S. PATENT DOCUMENTS

| | | |
|---|---|---|
| 6,075,510 A | 6/2000 | Blouin et al. |
| 7,068,813 B2 | 6/2006 | Lin |
| 7,262,765 B2 | 8/2007 | Brown et al. |
| 8,258,722 B2 | 9/2012 | Swoboda et al. |

(Continued)

OTHER PUBLICATIONS

International Search Report and the Written Opinion of the International Searching Authority, International Application No. PCT/US2020/056550, mailed Jan. 21, 2021.

*Primary Examiner* — Jennifer T Nguyen
(74) *Attorney, Agent, or Firm* — Barclay Damon LLP; Anthony P. Gangemi

(57) ABSTRACT

One embodiment provides a computing device. The computing device is configured to couple to a display. The computing device includes an ambient detection module configured to detect a characteristic of ambient light relative to at least a portion of a display area of the display. The computing device further includes a displayed image optimization module configured to optimize a feature of at least a portion of a displayed image based, at least in part, on the characteristic of the ambient light.

19 Claims, 6 Drawing Sheets

(56) References Cited

U.S. PATENT DOCUMENTS

| | | |
|---|---|---|
| 8,334,883 B2 | 12/2012 | Tin |
| 8,497,871 B2 | 7/2013 | Zulch |
| 8,519,424 B2 | 8/2013 | Hammond et al. |
| 8,553,019 B2 | 10/2013 | Vogsland |
| 8,729,823 B2 | 5/2014 | Swamy et al. |
| 8,743,158 B2 | 6/2014 | Kang |
| 9,280,184 B2 | 3/2016 | Broga et al. |
| 9,478,173 B2 | 10/2016 | Safaee-Rad et al. |
| 9,547,339 B2 | 1/2017 | Gwin et al. |
| 9,559,815 B1 | 1/2017 | Goshen |
| 9,569,990 B2 | 2/2017 | Ha |
| 9,820,360 B2 | 11/2017 | Paolini et al. |
| 10,182,260 B2 | 1/2019 | Chen et al. |
| 2008/0284716 A1 | 11/2008 | Edwards et al. |
| 2011/0187733 A1 | 8/2011 | Sun et al. |
| 2013/0033528 A1 | 2/2013 | Sarkar et al. |
| 2013/0057573 A1 | 3/2013 | Chakravarthula et al. |
| 2013/0328948 A1 | 12/2013 | Kunkel et al. |
| 2015/0346987 A1* | 12/2015 | Ren .................. G09G 3/3406 345/589 |
| 2016/0086529 A1 | 3/2016 | Myers et al. |
| 2016/0232829 A1 | 8/2016 | Ahn et al. |
| 2016/0314762 A1* | 10/2016 | Lee ..................... G09G 3/001 |
| 2018/0174526 A1 | 6/2018 | Chesnokov |
| 2019/0114971 A1* | 4/2019 | Choi .................. G09G 3/3266 |
| 2019/0228737 A1* | 7/2019 | Lin ...................... G01J 3/506 |

\* cited by examiner

SMART VISUAL DISPLAY

CROSS REFERENCE TO RELATED APPLICATION(S)

This application claims the benefit of U.S. Provisional Application No. 62/923,785, filed Oct. 21, 2019, and U.S. Provisional Application No. 63/093,858, filed Oct. 20, 2020, which are incorporated by reference as if disclosed herein in their entireties

FIELD

The present disclosure relates to a visual display, in particular to, a smart visual display.

SUMMARY

In some embodiments, there is provided a computing device. The computing device is configured to couple to a display. The computing device includes an ambient detection module configured to detect a characteristic of ambient light relative to at least a portion of a display area of the display. The computing device further includes a displayed image optimization module configured to optimize a feature of at least a portion of a displayed image based, at least in part, on the characteristic of the ambient light.

In some embodiments of the computing device, the displayed image optimization module is configured to optimize the feature of the at least a portion of the displayed image based, at least in part, on at least one of a viewer preference, a viewer characteristic, and/or a viewer emotional state.

In some embodiments, the computing device includes a calibration module configured to at least one of ascertain a viewer preference, capture a viewer characteristic, and/or capture a viewer biometric data. The calibration module is further configured to store the viewer preference, the viewer characteristic data and/or the viewer biometric data in a viewer profile associated with a unique viewer identifier.

In some embodiments of the computing device, the displayed image optimization module is further configured to optimize the feature of the at least a portion of the displayed image based, at least in part, on a feature of at least a portion of a display frame image.

In some embodiments of the computing device, the characteristic of the ambient light is selected from the group including an illuminance of the ambient light, and a spectral power distribution (SPD) of the ambient light; and the feature of the at least a portion of the displayed image is selected from the group including an illuminance of the at least a portion of the displayed image and an SPD of the at least a portion of the displayed image.

In some embodiments of the computing device, the ambient light includes at least one of background ambient light and/or foreground ambient light.

In some embodiments of the computing device, the feature of the at least a portion of the display frame image is selected from the group including an illuminance, a light intensity, a color temperature, and a spectral power distribution (SPD).

In some embodiments, there is provided a smart visual display. The smart visual display includes a display, a plurality of sensors, and a computing device. The display includes a display surface and an opposing back surface. The display surface includes a plurality of display portions. Each sensor is positioned relative to at least one of the display and/or a respective display portion. The computing device is configured to couple to the display. The computing device includes an ambient detection module configured to detect a characteristic of ambient light relative to at least a portion of a display area of the display, and a displayed image optimization module configured to optimize a feature of at least a portion of a displayed image based, at least in part, on the characteristic of the ambient light.

In some embodiments of the smart visual display, the displayed image optimization module is configured to optimize the feature of the at least a portion of the displayed image based, at least in part, on at least one of a viewer preference, a viewer characteristic, and/or a viewer emotional state.

In some embodiments of the smart visual display, the displayed image optimization module is further configured to optimize the feature of the at least a portion of the displayed image based, at least in part, on a feature of at least a portion of a display frame image.

In some embodiments of the smart visual display, at least one of the plurality of sensors is positioned adjacent to a perimeter of the display surface and the display area corresponds to an interior region of the display surface. In some embodiments of the smart visual display, the plurality of sensors are distributed over a display area of the display.

In some embodiments of the smart visual display, the display comprises a plurality of quantum dot light emitting diodes.

In some embodiments of the smart visual display, the computing device is configured to couple to at least one of another computing device to share viewer profile data and/or a smart visual display server to facilitate learning.

In some embodiments, there is provided a method for optimizing a displayed image. The method includes detecting, by an ambient detection module, a characteristic of ambient light relative to at least a portion of a display area of a display. The method further includes optimizing, by a displayed image optimization module, a feature of at least a portion of a displayed image based, at least in part, on the characteristic of the ambient light.

In some embodiments of the method, the optimizing, by the displayed image optimization module, the feature of the at least a portion of the displayed image is based, at least in part, on at least one of a viewer preference, a viewer characteristic, and/or a viewer emotional state.

In some embodiments, the method includes at least one of ascertaining, by a calibration module, a viewer preference, capturing, by the calibration module, a viewer characteristic, and/or capturing, by the calibration module, a viewer biometric data. The method further includes storing by the calibration module, the viewer preference, the viewer characteristic data and/or the viewer biometric data in a viewer profile associated with a unique viewer identifier.

In some embodiments, the method includes optimizing, by the displayed image optimization module, the feature of the at least a portion of the displayed image based, at least in part, on a feature of at least a portion of a display frame image.

In some embodiments, the method includes coupling, by a computing device to at least one of another computing device to share viewer profile data and/or a smart visual display server to facilitate learning.

In some embodiments, there is provided a computer readable storage device. The computer readable storage device has stored thereon instructions that when executed by one or more processors result in the following operations including: any embodiment of the method.

BACKGROUND

A perceived quality of a visual image displayed on a visual display (e.g., television screen, computer monitor, computing device screen, smart phone screen, etc.) may be affected by ambient light. An image that appears bright in a relatively dark environment may appear dim and unclear in a relatively bright environment. Similarly, an image that appears appropriately bright in a relatively bright environment may appear overly bright and unclear in a relatively dim environment. Thus, a poor quality image may be perceived when there is a mismatch between characteristics of the ambient light and features of the displayed image.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
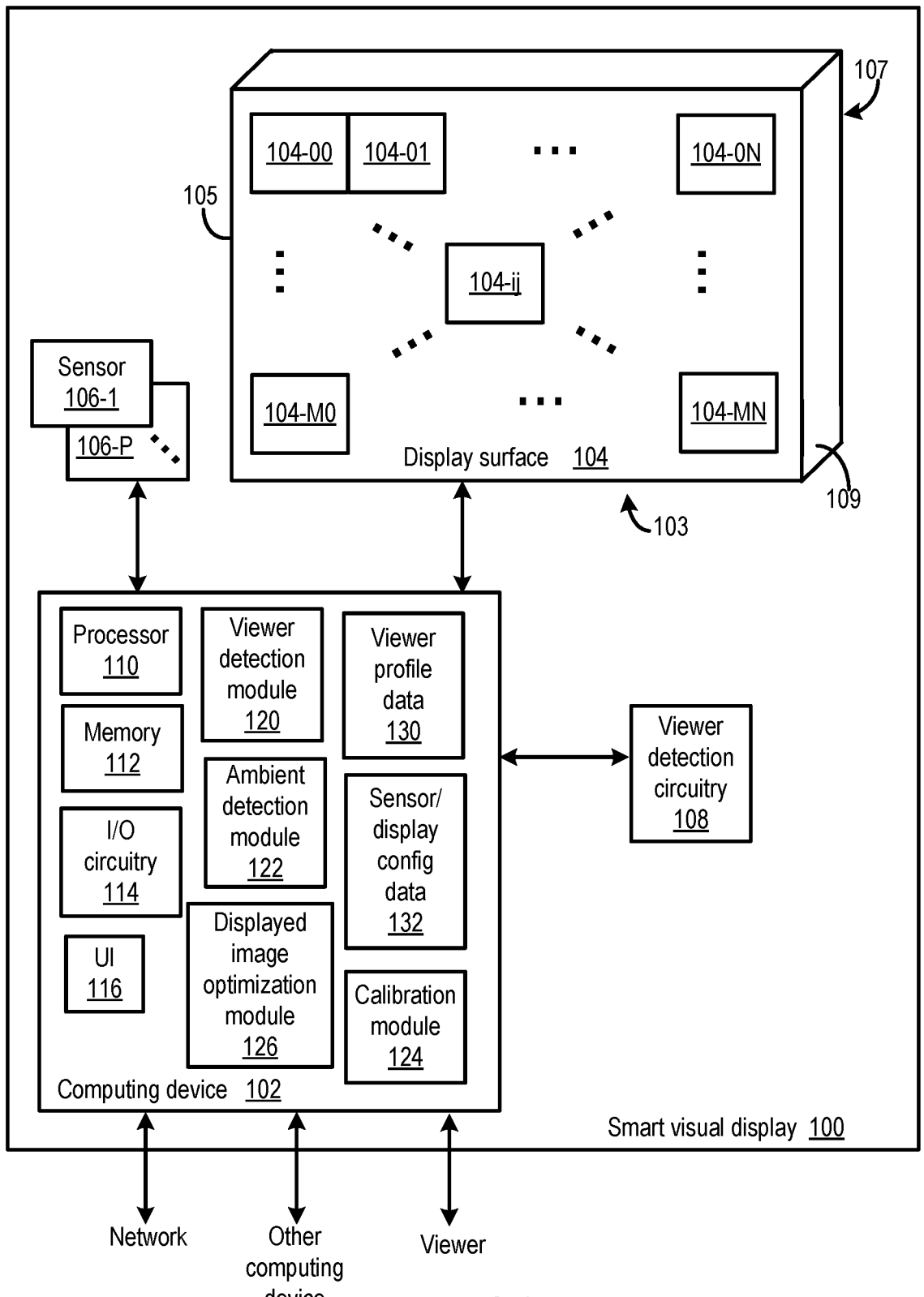
FIG. 1 illustrates a functional block diagram of a smart visual display consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Characteristics of ambient light, features of a displayed image and/or features of a display frame image may include, for example, illuminance, light intensity, color temperature, and/or spectral power distribution (SPD). A mismatch between ambient light and a displayed image may be especially severe in automotive or aircraft applications due to a relatively large variation between an ambient illuminance and an ability of a human visual system to adjust to the ambient light intensity, the ambient SPD, and the displayed image SPD.

Ambient light may be white or colored. Ambient light may include background ambient light and/or foreground ambient light. Thus, characteristics of ambient light may include characteristics of background ambient light and/or characteristics of foreground ambient light. In one nonlimiting example, background ambient light may be produced by a light source positioned generally behind a physical display. Background ambient light is incident with respect to a viewer, when the viewer is facing the display. Foreground ambient light is incident with respect to a display surface of the physical display. The display surface of the physical display includes a display area configured to display image content, as described herein. In one nonlimiting example, foreground ambient light may be produced by a light source positioned generally in front of the physical display. Thus, background ambient light may generally be impinging on a viewer and foreground ambient light may be generally impinging on a display (and display area).

Image content, (i.e., display frame content) may include a plurality of sequential display frame images and each display frame image may include a plurality of display frame regions. Each display frame region may have a respective set of feature values. Some image content (i.e., display frame content) may include both relatively bright and relatively dark display frame regions (e.g., image content that includes an explosion at night). Each display frame region may further vary in color content relative to one or more other display frame regions. Thus, matching a selected displayed image feature to a corresponding ambient light characteristic over an entire display may improve perceived image quality for a selected display portion but may degrade the perceived image quality for another display portion.

The perceived quality of the displayed image may be subjective. In other words, for a given set of ambient light characteristics, one viewer may prefer a different set of displayed image features compared to another viewer. For example, a selected viewer may prefer relatively brighter or relatively less bright display portions compared to another viewer. In another example, the selected viewer may prefer a different displayed image SPD compared to another viewer. Thus, optimum displayed image features may be related to viewer preference.

Generally, this disclosure relates to a smart visual display. An apparatus, method and/or system are configured to optimize displayed image features based, at least in part, on one or more of viewer preference, characteristics of ambient light, and display frame content. The apparatus, method, and/or system may be configured to optimize the displayed image features, selectively, for each of one or more display portions corresponding to displayed image regions. Thus, perceived display quality may be optimized to accommodate viewer preference, displayed content and/or characteristics of ambient light, over each of one or more display portions.

As used herein, spectral power distribution (SPD) corresponds to radiant power emitted by a light source at each wavelength or range (i.e., band) of wavelengths in the visible region of the electromagnetic spectrum. As used herein, illuminance corresponds to an amount of luminous flux per unit area. Illuminance may be related to brightness. As used herein, "display portion" corresponds to a fractional area of a physical display, e.g., a computer monitor, "display frame portion" corresponds to a fractional area of an image frame to be displayed, and "displayed image region" corresponds to a fractional area of an image displayed on the physical display.

FIG. 1 illustrates a functional block diagram of a smart visual display 100 consistent with several embodiments of the present disclosure. Smart visual display 100 may include a computing device 102, a display 103, at least one sensor 106-1, . . . , 106-P, and a viewer detection circuitry 108. In an embodiment, computing device 102 may be coupled to display 103. In another embodiment, display 103 may be included in computing device 102. In another embodiment, computing device 102 may be included in display 103. In some embodiments, one or more of sensors 106-1, . . . , 106-P may be coupled to display 103. In some embodiments, one or more of sensors number 106-1, . . . , 106-P may be included in display 103.

Computing device 102 may include, but is not limited to, a mobile telephone including, but not limited to, a smart phone (e.g., iPhone®, Android®-based phone, etc.); a wearable device (e.g., wearable computer, "smart" watch, smart glasses, etc.) and/or system; a computing system (e.g., a server, a workstation computer, a desktop computer, a laptop computer, a tablet computer (e.g., iPad®, Galaxy Tab®, Amazon Fire®, Microsoft Surface® and the like), an ultraportable computer, an ultra-mobile computer, a netbook computer and/or a subnotebook computer; etc. Display 103 may include, but is not limited to, a computer monitor, a computing device screen, a television screen, etc. Display 103 may be touch sensitive. Each sensor(s) 106-1, . . . , 106-P may include, but is not limited to, a photodetector, a camera, a quantum dot, a plurality of quantum dots, etc. In one nonlimiting example, one or more of the quantum dots may be configured to selectively absorb light of selected wavelength(s). Viewer detection circuitry 108 may include, but is not limited to, a camera, a biometric sensor, etc. Biometrics may include, but are not limited to, fingerprints, facial patterns, voice patterns, iris patterns, etc.

Display 103 may include, but is not limited to, electroluminescent display (ELD), liquid crystal display (LCD), light-emitting diode (LED) display, etc. LCD displays may include, but are not limited to, LED backlit LCD, thin-film transistor (TFT) LCD, etc. LED displays may include, but are not limited to, organic LED (OLED) display, active-matrix organic LED (AMOLED) display, quantum dot LED (QLED) display, etc.

Display 103 includes a display surface 104 and an opposing back surface 107. The display surface 104 has a perimeter 105. The display surface 104 and back surface 107 may be coupled by a plurality of side surfaces, e.g., side surface 109. The display surface 104 may be generally flat. The display surface 104 may include a plurality of display portions, e.g., display portion 104-ij. Each display portion corresponds to a respective displayed image region. The display portions may be arranged in an array and may generally be contiguous over the display surface 104. A display area of the display surface 104 may then correspond to the array of contiguous display portions. Thus, in one nonlimiting example, display 103, i.e., display surface 104, may include M+1 rows of N+1 display portions per row. A first row may include display portions 104-00, 104-01, . . . , 104-0N and a last row may include display portions 104-M0, . . . , 104-MN. In another example, display surface 104 may include N+1 columns of M+1 display portions per column. A first column may include display portions 104-00, . . . , 104-M0 and a last column may include display portions 104-0N, . . . , 104-MN. In an embodiment, the display portions may extend to a perimeter 105 of the display surface 104. In this embodiment, the display area extends to the perimeter 105 of the display surface 104. In another embodiment, the display portions may not extend to the perimeter 105 of the display surface 104. In this embodiment, the display area may not extend to the perimeter 105 of the display surface 104 and a perimeter region may be configured to include one or more sensors, as will be described in more detail below.

Figure 2:
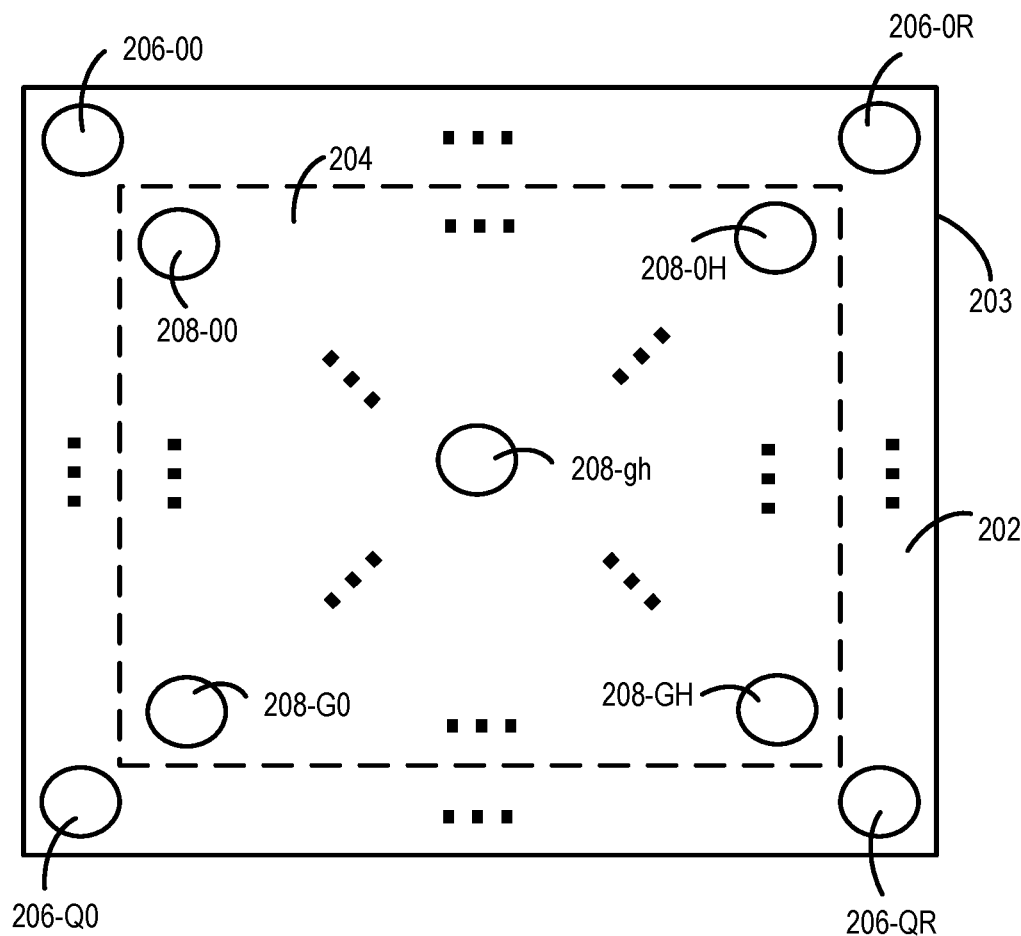
FIG. 2 is a sketch illustrating example sensor locations of sensors included in a sensor array consistent with several embodiments of the present disclosure.

FIG. 2 is a sketch illustrating example sensor locations of sensors included in a sensor array 200 consistent with several embodiments of the present disclosure. FIG. 2 is configured to illustrate at least some examples of physical arrangements of at least some of sensors 106-1, . . . , 106-P of FIG. 1. The physical arrangements of sensor array 200 may be with respect to a display surface and/or a back surface of a display, as described herein.

Sensor array 200 may have a perimeter region 202 and an inner region 204. Sensor array 200 includes a plurality of sensors that may be positioned, i.e., distributed, in the perimeter region 202 and/or the inner region 204. The perimeter region 202 is positioned adjacent a perimeter 203 of the sensor array 200. The perimeter region 202 may thus be bounded on an outside by sensor array perimeter 203 and on an inside by inner region 204. In one nonlimiting example, the perimeter 203 of the sensor array may be configured to be positioned at or near a perimeter of a corresponding display, e.g., perimeter 105 of display 103 of FIG. 1.

A first set of sensors that includes sensors 206-00, . . . , 206-QR may be positioned in the perimeter region 202. The first set of sensors may include two rows of R+1 sensors per row and two columns of Q+1 sensors per column. It may be appreciated that sensors 206-00, 206-0R, 206-Q0 and 206-QR, positioned at or near respective corners of the perimeter region, may each be included in both a row and a column. Thus, the perimeter region 202 may include a total of 2Q+2R sensors. For example, a first row may include sensors 206-00, . . . , 206-0R and a second row may include sensors 206-Q0, . . . , 206-QR. A first column may include sensors 206-00, . . . , 206-Q0 and a second column may include sensors 206-0R, . . . , 206-QR.

A second set of sensors that includes sensors 208-00, . . . , 208-GH (generally sensor 208-gh) may be positioned in the inner region 204. In one nonlimiting example, the second set of sensors may be arranged in an array and may include G+1 rows of H+1 sensors per row. A first row may include sensors 208-00, . . . , 208-0H and a last row may include sensors 208-G0, . . . , 208-GH. In another example, the second set of sensors may include H+1 columns of G+1 sensors per column. A first column may include sensors 208-00, . . . , 208-G0 and a last column may include sensors 208-0H, . . . , 208-GH.

Sensor array 200 is configured to be combined with a display, e.g., display 103 of FIG. 1. In an embodiment, at least one sensor may be positioned on a display surface of the display, e.g., display surface 104 of display 103. The at least one sensor is configured to detect foreground ambient light. In one nonlimiting example, sensor inner region 204 may correspond to a display area of display surface 104 that is configured to display image content. In this example, the display surface 104 region corresponding to sensor perimeter region 202 may not be configured to display image content. In another example, both the sensor perimeter region 202 and the sensor inner region 204 may correspond to the display area. Thus, in this example, the display surface region corresponding to the sensor perimeter region 202 may be configured to display image content.

In another embodiment, at least one sensor may be positioned on a back surface of the display, e.g., back surface 107 of display 103. The at least one sensor is configured to detect background ambient light. In one nonlimiting example, the at least one sensor may include one or more of the first set of sensors 206-00, . . . , 206-QR positioned in the perimeter region 202. In another example, the at least one sensor may include one or more of the second set of sensors 208-00, . . . , 208-GH positioned in the inner region 204. However, this disclosure is not limited in this regard.

Thus, sensor array 200 may include a plurality of sensors configured to be positioned relative to a display, e.g., display 103 and, in particular relative to display surface 104, one or more display portions of display surface 104, and/or back surface 107. The sensors are configured to detect ambient light, including foreground ambient light and/or background ambient light, as described herein.

Turning again to FIG. 1, computing device 102 includes a processor 110, a memory 112, an input/output (I/O) circuitry 114, and a user interface (UI) 116. Computing device 102 may further include a viewer detection module 120, an ambient detection module 122, a calibration module 124, and a displayed image optimization module 126. In one nonlimiting example, displayed image optimization module 126 may include and/or may correspond to an artificial neural network. However, this disclosure is not limited in this regard. Computing device 102 may further include a viewer profile data store 130 and a sensor/display configuration data store 132. Processor 110 is configured to perform one or more operations of viewer detection module 120, ambient detection module 122, calibration module 124, and displayed image optimization module 126. Memory 112 is configured to store information and/or data associated with modules 120, 122, 124, 126, viewer profile data 130, and/or sensor/display configuration data 132.

I/O circuitry 114 may be configured to communicate with one or more of display 103 (including individual display portion(s)), a network, another computing device and/or a viewer. I/O circuitry 114 may be configured to communicate via one or more of a mobile (e.g., cellular) telephone network, a cable television system configured to provide internet, telephone and/or television service, a local area network (LAN), a wide area network (WAN), etc. I/O circuitry 114 may be configured to communicate wired and/or wirelessly and/or a combination thereof. I/O circuitry 114 may be configured to comply and/or be compatible with one or more of a 3G, 4G and/or 5G cellular communication protocol and/or an IEEE 802.11 (e.g., Wi-Fi®) wireless communication protocol. In some embodiments, I/O circuitry 114 may be configured to communicate using a near field communication (NFC) protocol (e.g., Bluetooth®), when computing device 102 is in proximity to the display 103, other computing device(s), etc.

UI 116 may include a user input device (e.g., keyboard, keypad, mouse, touchpad, touch sensitive display, microphone, etc.) and a user output device (e.g., a display, a loudspeaker, etc.). UI 116 may be configured to receive inputs from a viewer, and/or to provide output to the viewer, as will be described in more detail below.

In operation, initially, computing device 102, e.g., displayed image optimization module 126, may be configured to acquire smart visual display configuration data from sensor/display configuration data store 132. Sensor/display configuration data 132 may include, for example, number and locations of display portions in display 103 and/or number and locations of sensors. The locations of the sensors may be relative to display surface 104 and/or display back surface 107. The sensor/display configuration data 132 may further include sensor type identifiers, display type identifiers, display size, etc. However, this disclosure is not limited in this regard.

Viewer detection module 120 may then be configured to determine whether a viewer is present, i.e., to detect a viewer. Whether a viewer is present may be determined using viewer detection circuitry 108. Viewer detection module 120 may be configured to capture an output signal from viewer detection circuitry 108. The output signal may include, for example, a captured image of a viewer, viewer biometric data, a viewer device (e.g., smart phone) identifier, etc. Viewer detection module 120 may then be configured to attempt to identify a viewer based, at least in part, on the captured output from the viewer detection circuitry 108. For example, the viewer detection module 120 may be configured to compare the captured output with the viewer identity data stored in viewer profile data 130.

Viewer identification operations may include, but are not limited to, attempting to recognize a face, recognizing a known user device, e.g., smart phone, that is in proximity to the display 103, recognizing a viewer biometric input, as described herein. If viewer recognition is unsuccessful, calibration operations may be initiated.

Calibration operations may be performed by calibration module 124. Calibration operations may include capturing viewer biometric data. Viewer biometric data may include, but is not limited to, an image of a viewer's face, a voiceprint, a fingerprint, an eye image, and/or a viewer device (e.g., smart phone) identifier. Calibration operations may further include capturing viewer characteristic data including, but not limited to, viewer age, viewer sex, and/or a viewer ethnicity indicator. In one nonlimiting example, the viewer characteristic data may be received in response to a query provided to the viewer from the calibration module 124 via, e.g., UI 116. The viewer biometric and characteristic data may then be stored in viewer profile data 130 and associated with a unique viewer identifier.

In some embodiments, calibration operations may further include ascertaining viewer preference(s) related to the displayed image features. Viewer preferences may include, but are not limited to, color gamuts, text font size, text font contrast, displayed image feature values, etc. The viewer preferences may be related to and/or associated with one or more ambient light characteristic values. In one nonlimiting example, calibration module 124 may be configured to provide displayed image examples, each having a respective value for a selected displayed image feature and to detect a viewer selection of a preferred value for the selected feature. For example, a plurality of displayed image examples, each having a respective color gamut may be displayed at one time with each display portion of a plurality of display portions illustrating a respective color gamut. In other words, displaying a plurality of displayed image examples having respective feature values in parallel (i.e., side by side) facilitates comparison of values of a selected feature by the viewer. Calibration module 124 may then be configured to capture viewer preference selections and to store a respective feature value associated with a feature indicator corresponding to each viewer preference selection in viewer profile 130 associated with the viewer identifier.

In some embodiments, computing device 102 and/or calibration module 124 may be configured to share, i.e., provide, viewer profile data to another computing device. In other words, viewer profile data from one viewer computing device may be shared across other of the viewer's computing devices.

In some embodiments, computing device 102 and/or calibration module 124 may be configured to upload at least some viewer profile data to a smart visual display server. The smart visual display server may be configured to receive viewer profile data associated with a plurality of viewers. The smart visual display server may be configured to utilize the plurality of viewer profile data sets to support and/or facilitate machine learning to relate ambient light characteristics, viewer profile data and corresponding optimized displayed image features. In one nonlimiting example, the smart visual display server may be configured to analyze and/or learn from a plurality of viewer profile data sets. Such analysis may include "big data" techniques configured to identify relatively more common viewer preferences based, at least in part, on the plurality of viewer profile data sets. The relatively more common viewer preferences may then be provided to one or more computing devices, thus providing a benefit of learning from a community of viewers.

In some embodiments, viewer detection module 120 may be configured to determine an identified viewer's emotional state. In one nonlimiting example, the viewer's emotional state may be determined based, at least in part, on the viewer's facial expression. In another example, the viewer's emotional state may be determined based, at least in part, on a viewer's voice. However, this disclosure is not limited in this regard. A viewer emotional state indicator may then be stored in viewer profile data 130.

Thus, a viewer may be identified based, at least in part, on viewer biometric data. The viewer may identified as part of calibration operations or the viewer may be identified based, at least in part, on previously acquired and stored viewer profile data. The identified viewer's preferences may then be retrieved from viewer profile data 130 by, e.g., viewer detection module 120.

Ambient light characteristics may then be detected by, for example, ambient detection module 122. Foreground ambient light characteristics values may be detected and/or determined for an individual display portion, for one or more group(s) that each include a respective plurality of display portions and/or for the entire display surface (i.e., entire display area). Background ambient light characteristics may be detected and/or determined for at least a portion of the display. The ambient light characteristics may be determined by ambient detection module based, at least in part, on output(s) from sensor(s) 106-1, . . . , and/or 106-P. One or more displayed image features of at least some display portions of display surface 104 may then be initialized, according to the viewer preferences, based, at least in part, on detected ambient light characteristics.

A current display frame image may then be captured and analyzed by displayed image optimization module 126. Analyzing the current display frame image may include determining values of one or more display frame features for display frame portions corresponding to one or more respective display portions. One or more displayed image features of displayed image regions corresponding to portions of the current display frame image may then be optimized based, at least in part, on one or more of the viewer profile data, the detected ambient light characteristics, the display frame features, and/or viewer emotional state. The capturing, analyzing and optimizing may then be repeated for each subsequent display frame image in a series of display frame images included in display content.

Optimization operations may include, but are not limited to, reducing a difference between displayed image feature values and corresponding user preference data, reducing a difference between respective displayed image feature values associated with adjacent display portions, etc. It may be appreciated that optimizing regions of the displayed image is configured to facilitate optimization of the displayed image based, at least in part, on features of the display frame image since features of the display frame image may vary over the image and ambient light characteristics may vary over the physical display and/or display area.

In some embodiments, one or more of viewer detection, viewer identification, and/or calibration may be repeated at a predetermined time interval and/or in response to a viewer request.

Thus, a smart visual display may be configured to optimize one or more displayed image features associated with one or more display portions to optimize a perceived quality of a displayed image. The optimizing may be performed based, at least in part, on one or more of content displayed, ambient light characteristics, viewer preference, and/or viewer emotional state.

In one nonlimiting example, a smart visual display may be utilized for viewing artwork. The smart visual display may be configured to optimize a displayed image of the artwork, e.g., a painting, so that the displayed image corresponds to a view of the artwork as it would appear under ambient illumination when it was painted. In other words, Impressionist painters, for example, created their artwork under $19^{th}$ century electrical lighting. In another example, the smart visual display may be configured to optimize a displayed image of the artwork to compensate for effects of aging. Such compensation may be performed, as appropriate, over a plurality of displayed image regions.

Additionally or alternatively, a smart visual display may be configured to incorporate a disinfecting, e.g., sterilizing, technique. In one nonlimiting example, the smart visual display, e.g., display 103, may be configured to include the ultraviolet light emitting diodes configured to sterilize a display surface 104 from bacteria and/or viruses after use. Such a smart visual display may be configured to provide an indication of having been cleaned and thus available for use by a subsequent viewer. However, this disclosure is not limited in this regard.

Figure 3:
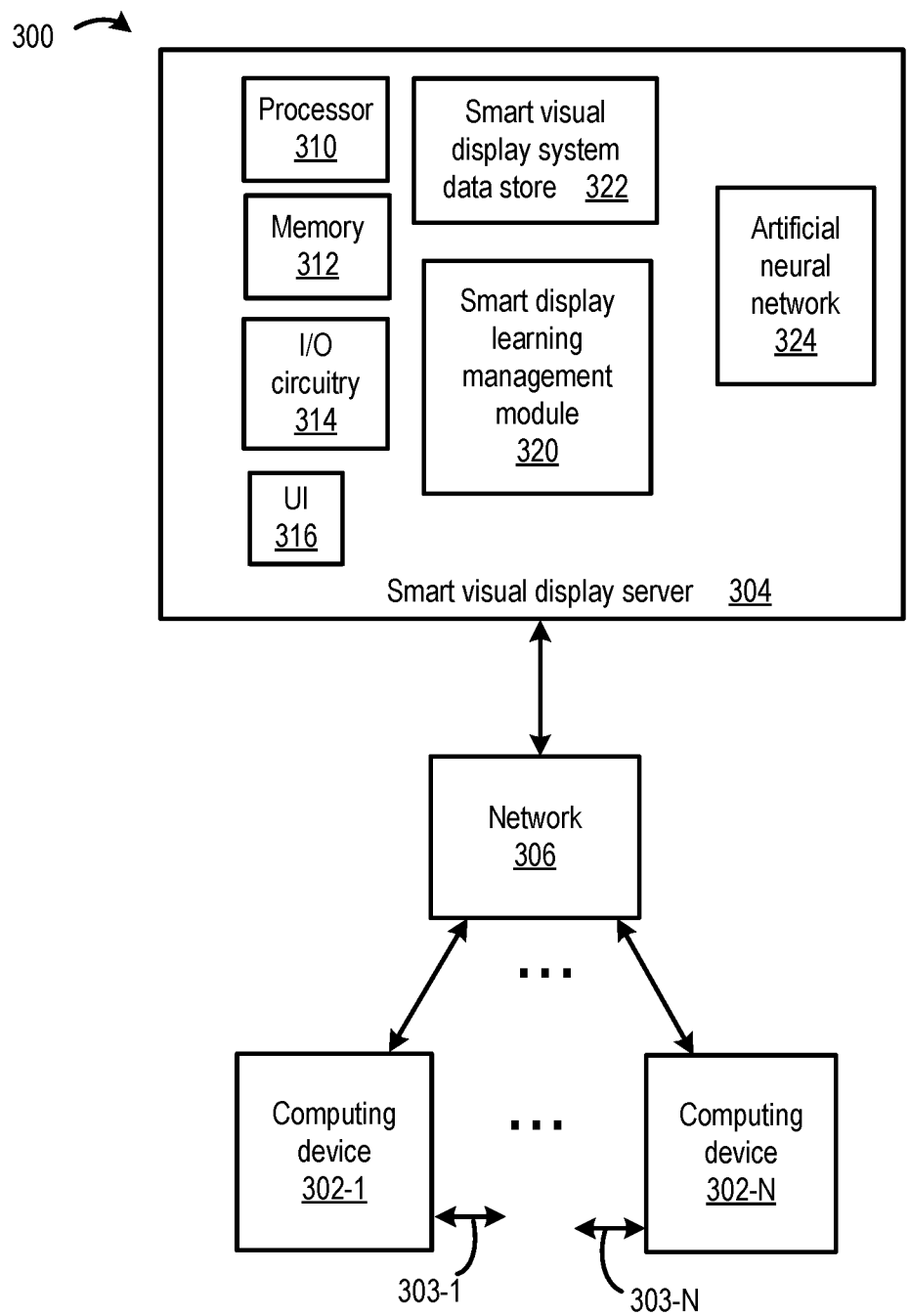
FIG. 3 illustrates a functional block diagram of a system including a smart visual display server consistent with several embodiments of the present disclosure.

FIG. 3 illustrates a functional block diagram of a system 300 including a smart visual display server consistent with several embodiments of the present disclosure. System 300 includes a plurality of computing devices 302-1, . . . , 302-N, a smart visual display server 304 and a network 306. Computing device 102 of FIG. 1 is one example of computing devices 302-1, . . . , 302-N. At least one computing device may be coupled to, included in, or may include, a display, e.g., display 103 of FIG. 1. Each computing device 302-1, . . . , 302-N may be coupled to the smart visual display server 304 and/or each other computing device via network 306. In one nonlimiting example, smart visual display server 304 may correspond to a computing resource located in a data center. As is known, a data center may include relatively powerful computing resources that may be time shared.

Each computing device 302-1, . . . , 302-N may be configured to communicate with one or more other computing devices via network 306 and/or a near field communication (e.g., Bluetooth®) link 303-1, . . . , 303-N. Near Field communication may occur when a plurality of computing devices 302-1, . . . , and/or 302-N are in proximity to one another. In one nonlimiting example, a plurality of computing devices may be configured to share viewer profile data that includes, for example, viewer preferences, over network 306 and/or NFC links 303-1, . . . , 303-N. In another nonlimiting example, a plurality of computing devices may be configured to share local illumination information. However, this disclosure is not limited in this regard.

Smart visual display server 304 includes a processor 310, a memory 312, an I/O circuitry 314 and a UI 316. Smart visual display server 304 may further include a smart display learning management module 320 and/or a smart visual display system data store 322. In some embodiments, smart visual display server 304 may include an artificial neural network 324. Processor 310 may be configured to perform one or more operations of smart visual display server 304, e.g., smart display learning management module 320 and/or artificial neural network 324. Memory 312 may include one or more types of memory, as described herein. Memory circuitry 312 may be configured to store information and/or data associated with processor 310, I/O circuitry 314, UI 316, smart display learning management module 320, smart visual display system data store 322 and/or artificial neural network 324.

In operation, smart visual display server 304, e.g., smart display learning management module 320, is configured to receive and/or acquire a respective viewer profile from each of the plurality of computing devices 302-1, . . . , 302-N. Each viewer profile may include viewer preferences related to displayed image features, as described herein. In one nonlimiting example, the viewer profile may be acquired at a predetermined time interval. In another example, each viewer profile may be provided in response to a change in contents of the viewer profile. The viewer profiles may be stored in smart display system data store 322.

Smart visual display server 304, e.g., smart display learning management module 320, may be further configured to receive and/or acquire a plurality of smart display data sets. The smart display data set may be stored in smart display system data store 322. The smart display data sets may include, for example, training data configured to be utilized for supervised training of artificial neural network 324. The training data may thus include input data, corresponding output data and constraint information. Input data may include, for example, one or more of ambient light characteristic values, display frame feature values, and/or displayed image feature values. Output data may include control parameter values configured to optimize one or more displayed image features over one or more displayed image regions. In one nonlimiting example, control parameter values may be configured to increase or decrease display portion SPD and/or display portion illuminance. In one nonlimiting example, constraint information may be related to viewer preference for one or more displayed image features, as described herein.

Artificial neural network 324 may be trained based, at least in part, on the viewer profiles and based, at least in part, on the smart display data sets. In some embodiments, the training may be supervised. Supervised learning corresponds to learning a function that maps an input to an output based on example input-output pairs. In supervised learning, a function may be inferred from labeled training data consisting of a set of training examples. Such supervised learning may include, but is not limited to, classification and/or regression analysis. Classification is an instance of supervised learning, i.e., learning where a training set of correctly identified observations is available. Regression analysis aims to model a relationship between a given number of features and a continuous target variable.

In some embodiments, the training may be unsupervised. Unsupervised learning is configured to look for previously undetected patterns in a data set with no pre-existing labels and with a minimum of human supervision. Unsupervised learning may be configured to group data based, at least in part, on the input data and may include, but is not limited to, clustering. Clustering includes grouping data into categories based on some measure of inherent similarity or distance. Clustering corresponds to grouping a set of objects in such a way that objects in the same group (called a cluster) are more similar (in some sense) to each other than to those in other groups (clusters).

Smart display server 304, e.g., smart display learning management module 320, may be configured to provide resulting respective neural network configuration data to each smart display, e.g., to each corresponding computing device. Thus, each smart visual display may benefit from machine learning and/or data sets from a plurality of viewers.

Thus, displayed image features may be optimized based, at least in part, on one or more of viewer preference, characteristics of ambient light, and display frame content. The displayed image features may be optimized, selectively, for each of one or more display portions corresponding to displayed image regions. Thus, perceived display quality may be optimized to accommodate viewer preference, displayed content and/or characteristics of ambient light, over each of one or more display portions. Thus, variations in ambient light characteristics and/or variations in display frame content over the display may be accommodated. Additionally or alternatively, viewer preferences may be similarly accommodated.

Figure 4:
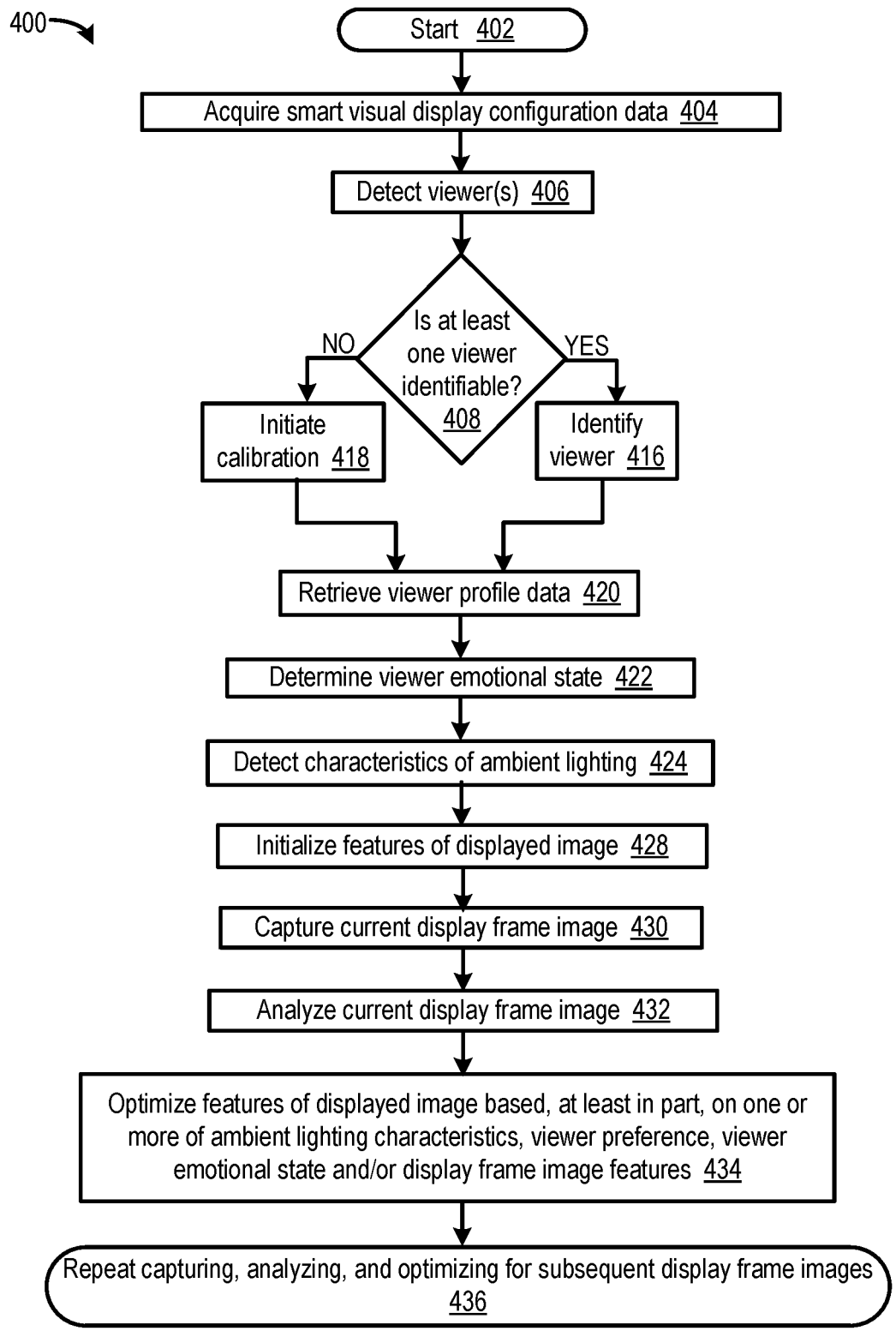
FIG. 4 is a flowchart of smart visual display optimization operations according to various embodiments of the present disclosure.

FIG. 4 is a flowchart of smart visual display optimization operations according to various embodiments of the present disclosure. In particular, the flowchart 400 illustrates optimizing displayed image features corresponding to one or more display portions of a smart visual display. The operations may be performed, for example, by viewer detection module 120, ambient detection module 122 and/or displayed image optimization module 126 of FIG. 1.

Operations of this embodiment may begin with start 402. Operation 404 includes acquiring smart visual display configuration data. Viewer(s) may be detected at operation 406. Whether at least one viewer is identifiable may be determined at operation 408. If a viewer is identifiable, the viewer may be identified at operation 416. If a viewer is not identifiable, calibration operations, as described herein, may be initiated at operation 418.

Viewer profile data may be retrieved at operation 420. For example, viewer profile data may be retrieved from a viewer profile data store. A viewer emotional state may be determined at operation 422. Ambient light characteristics may be detected at operation 424. The ambient light characteristics may be detected over one or more portions or all of a physical display area. Operation 428 includes initializing features of a displayed image.

A current display frame image may be captured at operation 430. The current display frame image may be analyzed at operation 432. Operation 434 includes optimizing features of a displayed image for at least some display portions. The optimizing may be performed based, at least in part, on one or more of ambient light characteristics, viewer preference, viewer emotional state, and/or display frame image features. Operation 436 includes repeating the capturing, analyzing and optimizing of operations 430, 432, and 434 for subsequent display frame images.

Thus, the displayed image features corresponding to the current display frame image may be optimized based, at least in part, on one or more of the viewer profile data (e.g., viewer preferences), ambient light characteristics, display frame features, and/or viewer emotional state.

Figure 5:
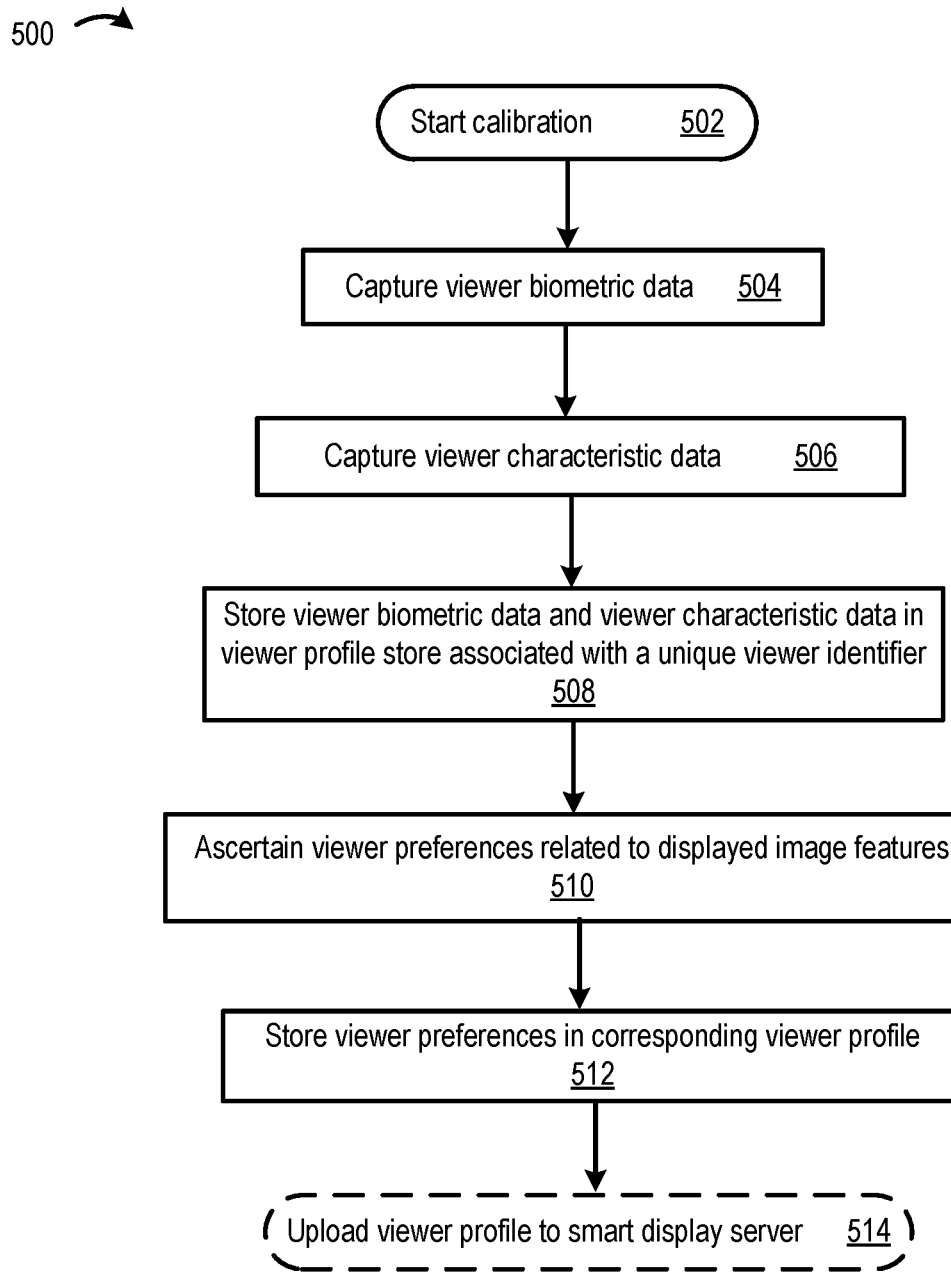
FIG. 5 is a flowchart of smart visual display calibration operations according to various embodiments of the present disclosure.

FIG. 5 is a flowchart of smart visual display calibration operations according to various embodiments of the present disclosure. In particular, the flowchart 500 illustrates calibrating a smart visual display. The operations may be performed, for example, by calibration module 124 of FIG. 1.

Operations of this embodiment may begin with start calibration at operation 502. Viewer biometric data may be captured at operation 504. Viewer characteristic data may be captured at operation 506. Operation 508 includes storing viewer biometric data and viewer characteristic data in a viewer profile data store, associated with a unique viewer identifier. Viewer preferences related to displayed image features may be ascertained at operation 510. Viewer preferences may be stored in a corresponding viewer profile at operation 512. In some embodiments, the viewer profile may be uploaded to a smart visual display server at operation 514.

Thus, viewer identification data, viewer characteristic data and viewer preference data may be acquired and/or determined and then stored in a corresponding viewer profile.

Figure 6:
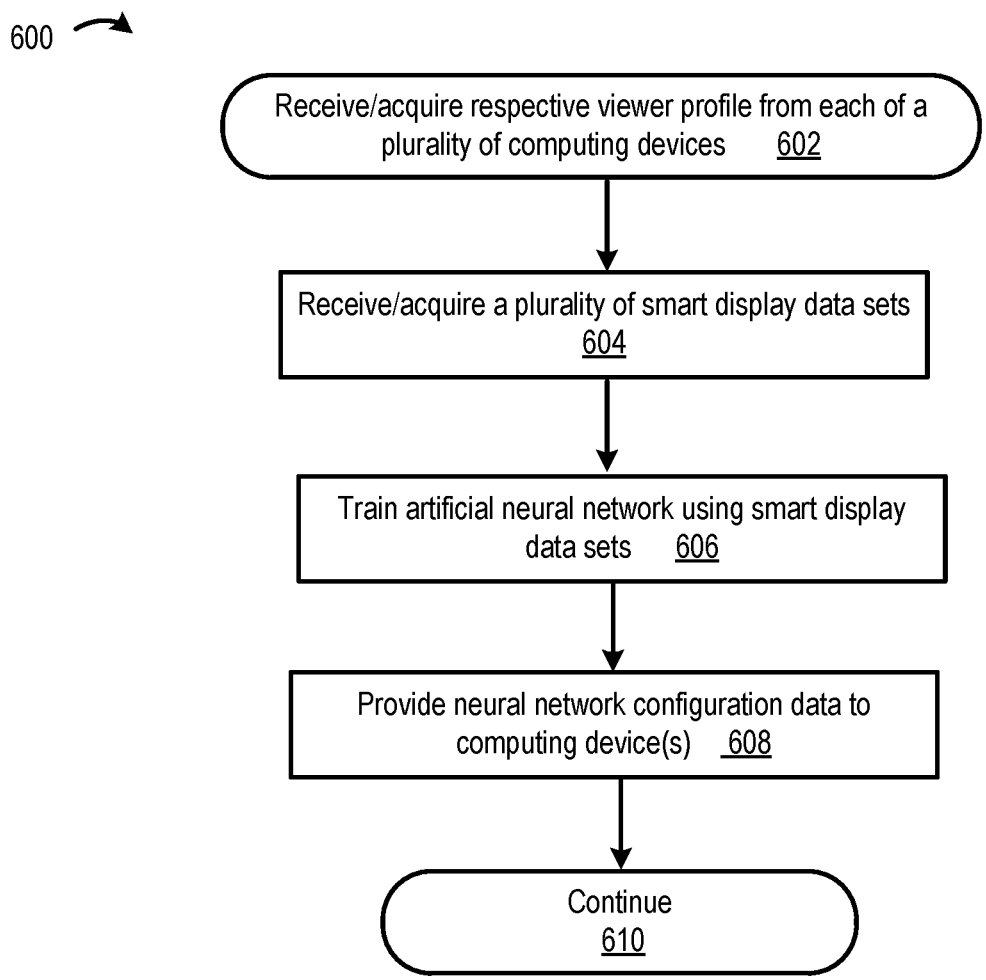
FIG. 6 is a flowchart of smart visual display server operations according to various embodiments of the present disclosure.

FIG. 6 is a flowchart of smart visual display server operations according to various embodiments of the present disclosure. In particular, the flowchart 600 illustrates training an artificial neural network based, at least in part, on viewer preferences. The operations may be performed, for example, by smart display learning management module 320 of FIG. 3.

Operations of this embodiment may begin with receiving and/or acquiring a respective viewer profile data for each of a plurality of smart visual displays at operation 602. A plurality of smart display data sets may be received and/or acquired at operation 604. Operation 606 includes training an artificial neural network using smart display data sets. Neural network configuration data may be provided to one or more smart visual display(s) (e.g., associated computing device(s)) at operation 608. Program flow may then continue at operation 610.

Thus, an artificial neural network may be trained based, at least in part, on viewer preferences and the neural network configuration data may be provided to corresponding smart visual displays. Thus, each smart visual display may benefit from the training and learning of a plurality (e.g., community) of smart visual displays.

While the flowcharts of FIGS. 4 through 6 illustrate operations according various embodiments, it is to be understood that not all of the operations depicted in FIGS. 4 through 6 are necessary for other embodiments. In addition, it is fully contemplated herein that in other embodiments of the present disclosure, the operations depicted in FIGS. 4, 5, and/or 6 and/or other operations described herein may be combined in a manner not specifically shown in any of the drawings, and such embodiments may include less or more operations than illustrated in FIGS. 4 through 6. Thus, claims directed to features and/or operations that are not exactly shown in one drawing are deemed within the scope and content of the present disclosure.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 110, 310 executing code and/or instructions sets (e.g., software, firmware, etc.) corresponding to the functionality described herein, thus transforming a general-purpose processor into a specific-purpose processing environment to perform one or more of the operations described herein.

Memory 112, 312 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A computing device configured to couple to a display, the computing device comprising:
    an ambient detection module configured to detect a characteristic of ambient light relative to at least a portion of a display area of the display;
    a displayed image optimization module configured to optimize a feature of at least a portion of a displayed image based, at least in part, on the characteristic of the ambient light wherein the displayed image optimization module is configured to optimize the feature of the at least a portion of the displayed image based, at least in part, on at least one of a viewer preference, a viewer characteristic, and a viewer emotional state;
    a calibration module configured to at least one of ascertain a viewer preference, capture a viewer characteristic, and/or capture a viewer biometric data, and to store at least one of the viewer preference, the viewer characteristic data and the viewer biometric data in a viewer profile associated with a unique viewer identifier, and
    wherein the computing device is configured to couple to at least one of another computing device to share viewer profile data and a smart visual display server to facilitate machine learning.

2. The computing device of claim 1, wherein the displayed image optimization module is further configured to optimize the feature of the at least a portion of the displayed image based, at least in part, on a feature of at least a portion of a display frame image.

3. The computing device of claim 2, wherein the feature of the at least a portion of the display frame image is selected from the group comprising an illuminance, a light intensity, a color temperature, and a spectral power distribution (SPD).

4. The computing device according to claim 1, wherein the characteristic of the ambient light is selected from the group comprising an illuminance of the ambient light, and a spectral power distribution (SPD) of the ambient light; and the feature of the at least a portion of the displayed image is selected from the group comprising an illuminance of the at least a portion of the displayed image and an SPD of the at least a portion of the displayed image.

5. The computing device according to claim 1, wherein the ambient light comprises at least one of background ambient light and foreground ambient light.

6. The computing device of claim 1, wherein the smart visual display server comprises an artificial neural network.

7. The computing device of claim 6, wherein the artificial neural network is trained to analyze and learn from viewer profile data sets from a plurality of said computing devices in which resulting neural network configuration data is provided to the computing device.

8. A smart visual display comprising:
a display comprising a display surface and an opposing back surface, the display surface comprising a plurality of display portions;
a plurality of sensors, each sensor positioned relative to at least one of the display and/or a respective display portion; and
a computing device configured to couple to the display, the computing device comprising an ambient detection module configured to detect a characteristic of ambient light relative to at least a portion of a display area of the display, and a displayed image optimization module configured to optimize a feature of at least a portion of a displayed image based, at least in part, on the characteristic of the ambient light, wherein the displayed image optimization module is configured to optimize the feature of the at least a portion of the displayed image based, at least in part, on at least one of a viewer preference, a viewer characteristic, and a viewer emotional state,
wherein the computing device is configured to couple to at least one of another computing device to share viewer profile data and a smart visual display server to facilitate machine learning.

9. The smart visual display of claim 8, wherein the displayed image optimization module is further configured to optimize the feature of the at least a portion of the displayed image based, at least in part, on a feature of at least a portion of a display frame image.

10. The smart visual display according to claim 8, wherein at least one of the plurality of sensors is positioned adjacent to a perimeter of the display surface and the display area corresponds to an interior region of the display surface.

11. The smart visual display according to claim 8, wherein the plurality of sensors are distributed over a display area of the display.

12. The smart visual display according to claim 8, wherein the display comprises a plurality of quantum dot light emitting diodes.

13. The smart visual display of claim 8, wherein the smart visual display server comprises an artificial neural network.

14. The smart visual display of claim 13, wherein the artificial neural network is trained to analyze and learn from viewer profile data sets from a plurality of computing devices of a corresponding plurality of smart visual displays, and in which resulting neural network configuration data is provided, enabling the smart visual display to benefit from the training and learning of the plurality of smart visual displays.

15. The method of claim 13, further comprising the training of the artificial neural network via the receipt of viewer profile data from a plurality of said smart display devices, and the transmission of resulting neural network configuration data from the artificial neural network to the smart visual display.

16. A method for optimizing a displayed image, the method comprising:
detecting, by an ambient detection module, a characteristic of ambient light relative to at least a portion of a display area of a display; and
optimizing, by a displayed image optimization module, a feature of at least a portion of a displayed image based, at least in part, on the characteristic of the ambient light, wherein the optimizing, by the displayed image optimization module, the feature of the at least a portion of the displayed image is based, at least in part, on at least one of a viewer preference, a viewer characteristic, and a viewer emotional state;
at least one of ascertaining, by a calibration module, a viewer preference, capturing, by the calibration module, a viewer characteristic, and/or capturing, by the calibration module, a viewer biometric data; and storing by the calibration module, the viewer preference, the viewer characteristic data and the viewer biometric data in a viewer profile associated with a unique viewer identifier; and
coupling, by a computing device to at least one of another computing device to share viewer profile data and a smart visual display server to facilitate machine learning.

17. The method of claim 16, further comprising optimizing, by the displayed image optimization module, the feature of the at least a portion of the displayed image based, at least in part, on a feature of at least a portion of a display frame image.

18. A computer readable storage device having stored thereon instructions that when executed by one or more processors result in the following operations comprising: the method according to claim 16.

19. The method of claim 16, wherein the smart visual display server comprises an artificial neural network.

* * * * *